United States Patent
Read

(10) Patent No.: US 8,438,181 B2
(45) Date of Patent: May 7, 2013

(54) AUTOMATED WRIT RESPONSE SYSTEM

(75) Inventor: Robert J. Read, San Francisco, CA (US)

(73) Assignee: Facebook Inc., Menlo Park, CA (US)

( * ) Notice: Subject to any disclaimer, the term of this patent is extended or adjusted under 35 U.S.C. 154(b) by 39 days.

(21) Appl. No.: 13/074,924

(22) Filed: Mar. 29, 2011

(65) Prior Publication Data

US 2012/0254222 A1    Oct. 4, 2012

(51) Int. Cl.
*G06F 17/30* (2006.01)
(52) U.S. Cl.
USPC .......................................... 707/769
(58) Field of Classification Search .............. 707/706, 707/707, 731, 736, 758, 769, 770, 771
See application file for complete search history.

(56) References Cited

U.S. PATENT DOCUMENTS

| | | | | |
|---|---|---|---|---|
| 6,981,216 B1 * | 12/2005 | Brandes | ........................ | 715/234 |
| 7,162,428 B1 * | 1/2007 | Rosenthal et al. | ............. | 705/300 |
| 2003/0069742 A1 * | 4/2003 | Lawrence | ......................... | 705/1 |
| 2005/0240578 A1 * | 10/2005 | Biederman et al. | ............... | 707/3 |
| 2012/0095889 A1 * | 4/2012 | Santarlas | ........................ | 705/34 |

* cited by examiner

Primary Examiner — Cam-Linh Nguyen
(74) Attorney, Agent, or Firm — Baker Botts L.L.P.

(57) ABSTRACT

Methods, apparatuses and systems facilitating responses to writs, such as subpoenas, in an efficient and timely manner. Implementations of the invention may include a writ response module and a queue manager to offer web service providers to automatically generate reports in response to various writs and to prioritize processing and human review prior to delivery of results.

20 Claims, 3 Drawing Sheets

AUTOMATED WRIT RESPONSE SYSTEM

TECHNICAL FIELD

The present disclosure generally relates to responding to information requests (such as writs, subpoenas, and other forms of requests for information), and in particular, to systems for facilitating responses to such requests for network service providers.

BACKGROUND

A writ is a formal written order issued by a body with administrative or judicial jurisdiction, commanding the person or legal entity to whom it is addressed to provide information described in the writ. Warrants, prerogative writs and subpoenas are types of writs. Web service providers, such as social networking systems, email providers, and the like, typically maintain an array of data regarding its users. Typically, each web service provider controls access to user information based on a privacy policy. Currently, when web service providers receive a writ from a law enforcement agency, there is no automated system to assist with preparing a response. Rather, gathering the data relating to an identified user generally involves a manual process of generating several queries and collecting the information.

SUMMARY

The present invention provides methods, apparatuses and systems facilitating responses to writs, such as subpoenas, in an efficient and timely manner. Implementations of the invention may include a writ response module and a queue manager to offer web service providers to automatically generate reports in response to various writs and to prioritize processing and human review prior to delivery of results.

DESCRIPTION OF EXAMPLE EMBODIMENTS

Figure 1:
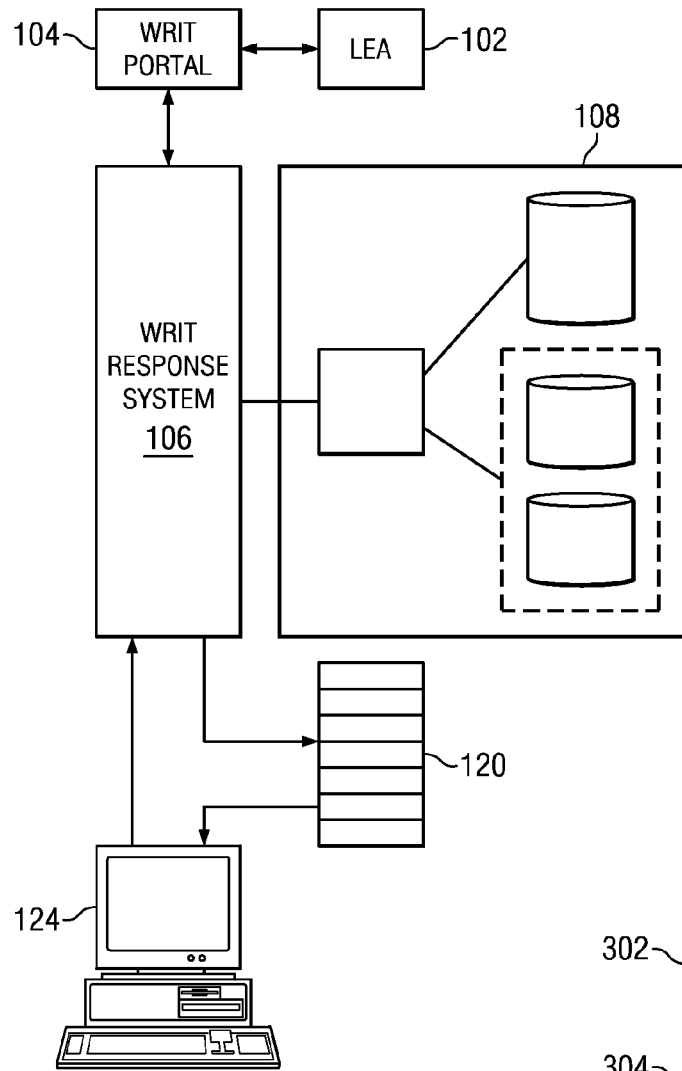
FIG. 1 is a schematic diagram illustrating an example system including a writ response system according to one implementation of the invention.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A writ is a formal written order issued by a body with administrative or judicial jurisdiction, commanding the person to whom it is addressed to do or refrain from doing some specified act. Warrants, prerogative writs and subpoenas are types of writs. A subpoena is a legal order commanding the person or organization named in the subpoena to give sworn testimony at a specified time and place about a matter concerned in an investigation or a legal proceeding, such as a trial. Witnesses or nonparties to litigation may be in possession of relevant materials and, as such, may be subject to subpoenas, preservation notices or legal holds. A legal hold, for example, is a communication that suspends the normal disposition or processing of records and may alternatively be called a "preservation notice," "preservation order" or "hold notice."

Preservation notices or requests may precede the issuance of a subpoena, which makes formal legal demand for the production of the needed items. Elements may include but are not limited to the following: a statement of the name, venue and basic elements of the litigation or investigation sufficient that the recipient can fully understand the matter at hand; a description of the legal or business relationship between the requesting party and the non-party recipient; a copy of or reference to any contract or agreement that was in effect during the relevant time period; identification of the range of different types of material to be preserved; a request to halt normal business practices that may destroy potential evidence, such as server back-up tape rotation, electronic data shredding, drive re-imaging, the sale/gift/destruction of computer systems and disk defragmentation or routine computer maintenance; instructions to communicate retention obligations to all persons either in the organization or in control of the organization who may have access to relevant material, as well as to any IT personnel or employees with hands-on access to electronic and computer systems; a request that the recipient direct any questions about the subject matter or scope of the notice to a designated legal representative of the requesting party; a request that the non-party recipient periodically reissue and refresh the notice distributed to remind persons having relevant material that the notice is still in effect until they are otherwise advised; written acknowledgement of receipt of notice; confirmation of intent to comply with preservation request; and the like.

A privacy policy is a legal document that discloses some or all of the ways a network or web service provider gathers, uses, discloses and manages a user's or customer's data. The exact terms of a privacy policy will depend upon the service and applicable law and may need to address the requirements of a variety of different jurisdictions. While there is no universal guidance for the content of specific privacy policies, generally service providers require personally identifying information such as name, email, gender, birth date, finance information, contact information, and the like. They use this information to manage the service, to contact users, to make advertisement suggestions, and the like.

On the other hand, when a crime is committed, a government law enforcement agency may request a web or network service provider to provide information related to an identified user or other legal entity. In other situations, law enforcement or other government agencies may also seek user information in connection with civil or administrative matters. The requests may be in the form of preservation requests, subpoenas, search warrants, court orders, or related legal writs. For service providers, there exists a tension between preserving user privacy and responding in a timely manner to legal process requests. Accordingly, for larger service providers, it may require a significant amount of human resources to gather the requested information and fulfill the requests, while at the same time guarding user privacy to the greatest extent possible.

Currently, when web service providers who have user information receive a writ from a law enforcement agency (LEA), there is no automated system to facilitate generating responses that include the requested data. Most of the time, there is one person or group in charge of handling responses to writs. This person or group generally validates the response, gathers related data, and then sends the data to the requesting LEA. However, searching for and collecting data takes an extensive amount of time and may result in a delayed response. For example, relevant information may be stored in user profile or account databases, server or web logs, and the like.

Various implementations of the invention provide an example system that automatically generates responses to various writs in an efficient and prioritized manner to assist network service providers in complying with such writs in a timely and efficient process. FIG. 1 is a functional block diagram that illustrates an example system and network environment. As FIG. 1 illustrates, an example network environment and system includes one or more law enforcement agencies 102, a writ portal system 104, a writ response system 106, and a network service provider system 108. Writ portal system 104 is an automated or semi-automated system that LEAs can use to submit various types of writs and data preservation requests for execution. LEAs may access writ portal system 104 by email, phone, and fax, causing a human operator to process a writ request. In other implementations, LEAs may access writ portal system 104 using a computing system to send a writ request to writ portal system 104 that supports a set of application programming interfaces (APIs) that facilitate submission of requests to the writ portal system 104. Writ portal system 104 may interface with a variety of different LEAs over a vast array of communications channels. In one implementation, writ portal system 104 is responsible for translating writ requests in various different forms and formats into one of a standardized set of writ requests for submission to writ response system 106. In one implementation, writ portal system 104 may be operated by a third party relative to the entity or enterprise that operates and maintains writ response system 106 and/or network service provider system 108. For example, writ portal system 104 may be maintained by a specialized, third party service or platform—such as Yaana Technologies, LLC of Milpitas, Calif. In one implementation, writ portal system 104 maintains computerized systems that transmit requests for information corresponding to a given writ and also include scheduling functionality that retries the requests based on a schedule to later obtain the requested information.

In one implementation, writ response system 106 supports a set of APIs that allows writ portal system 104 to register writ requests for processing. In one implementation, writ response system 106 supports HTTP functionality allowing writ portal system 104 to transmit writ requests. In one implementation, a writ request includes one or more of the following attributes: a user identifier (or identifying information that maps to a user identifier), a type of writ (e.g., preservation request, pen register, subpoena, warrant, etc.), an identifier for the requesting law enforcement agency, and one or more tags describing meta information about the request, copies of (or links to) supporting documentation (including, in some instances, the formal writ itself). As discussed below, writ response system 106 is operative to process the request, schedule one or more synchronous and/or asynchronous data generation jobs, and deliver a response to the writ request.

Writ response system 106 accesses one or more systems of network service provider system 108 to generate data responsive to a given writ request. In one implementation, writ response system 106 generates one or more jobs that query various systems of network service provider system 108 based on the type of writ associated with the request. In most implementations, the same enterprise or legal entity maintains both writ response system 106 and network service provider system 108. In other implementations, writ response system 106 is maintained as a third party system separate from network service provider system.

Figure 2:
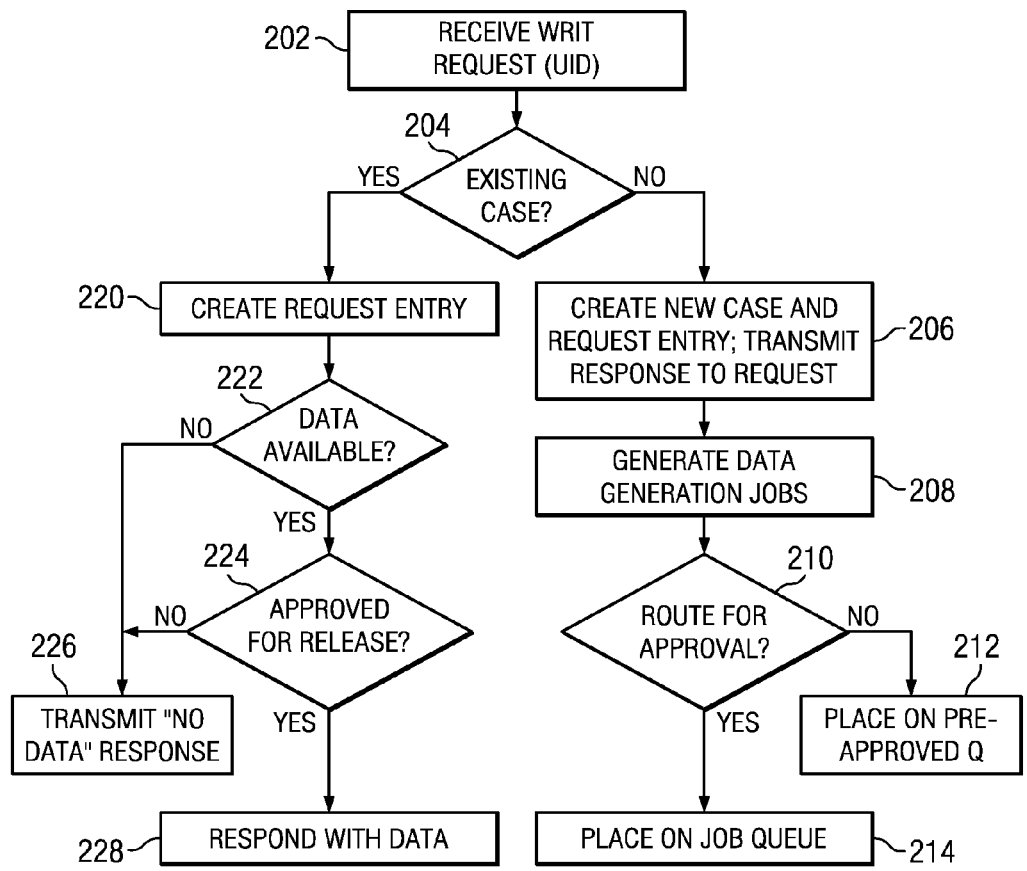
FIG. 2 illustrates an example process flow according to one implementation of the invention.

FIG. 2 illustrates an example method, implemented by writ response system 106, for processing a writ request. In one implementation, when writ response system 106 receives a writ request from writ portal system 104 (202), it accesses a database of open cases against the user identifier identified in the request to determine whether a case corresponding to the request and user identifier has already been opened (204). If no existing case is identified, writ response system 106 creates a new case entry and a new request entry in the database, and transmits an initial response to the request (206). In one implementation, the database is a relational database including a case table and a request table. In one implementation, the cases table includes the following fields: a case identifier, a writ portal identifier, a writ date, a law enforcement agency identifier, a law enforcement agency country, a request type, a secret key, a secret type, and a delete-by date. In some implementations, the requests table includes the following fields: a data request identifier, a case identifier, a user identifier, requested content type identifiers, content URLs, an internal reviewer identifier, an approved flag, start date, end date, a delivered flag, a delivery method identifier, a generated flag, and the like. The initial response to the request, in one implementation, is essentially an acknowledgment of the request, but may not contain any requested data. The initial response may include a case identifier and other information that writ portal system 104 may include in future requests for the same case. In one implementation, writ portal system 104 is configured to send additional requests for data at periodic intervals, such as every hour, until a full response is received. In another implementation, the initial response may include a time value indicating when the writ portal system 104 should check back for information.

Writ response system 106 then generates one or more data generation jobs based on the type of writ (208). For example, different writ types may require access to different types of information maintained by or available through network service provider system 108. As discussed above, writ types may include preservation requests, pen registers, subpoenas, search warrants, court orders, and the like. In addition, some job types may spawn synchronous requests, while others may spawn asynchronous requests. Still further, some jobs may be executed periodically to gather data over successive intervals.

Network service provider system 108 may host one or more network applications. In embodiments where network service provider 108 hosts a social networking application, the data generation jobs may include jobs directed to retrieving one or more of the following attributes or information types: 1) user profile information associated with the user identifier, 2) wall posts associated with the user identifier, 3) news feed items associated with the user identifier, 4) notes, 5) shared links, 6) installed applications, 7) group memberships, 8) events associated with the user identifier; 9) friends or contacts associated with the user identifier; 10) basic subscriber or user information, 11) photographs associated with the user identifier; 12) chat logs, and 13) web logs (time stamp, user id, URL, and remote IP address). Other types of network applications may include other types of information, such as emails sent or received, web pages sent or received, blog posts, and the like. In addition, some report generation jobs may check the data stores maintained by writ response system 106 to determine whether any data was stored in response to a previously issued preservation request. This information may be maintained by a variety of different systems internal to network service provider system 108. As discussed above, writ response system 106 may generate one or more different jobs that may be served synchronously or asynchronously. Responses generated by the different jobs are processed by a queue manager that, as discussed below, may place the responses on a queue in a manner that is prioritized based on one or more tags or other information associated with a request or case.

In one implementation, some writ types may require approval before execution. For example, search warrants, subpoenas, and the like may require approval prior to execution. For such writ types, writ response system 106 may route these requests to a pre-approval queue for review by an administrator (210, 212). Otherwise, writ response system 106 routes the request to one or more job queues for execution (214). For example, in one implementation, preservation requests are routed directly for processing, as no information is returned in response to the requests. Rather, a follow-up search warrant or subpoena is generally required to obtain the preserved information. As data is generated and returned, it is stored in a persistent data store in association with the case identifier. Receipt of the information also causes a review job entry to be placed on a review queue by a queue manager process that may prioritize placement on the queue based on one or more attributes of the case.

If the writ request corresponds to an existing case (204), writ response system 106 creates a new request entry in a requests table (220). Writ response system 106 may also access a data store of responsive information to determine whether any data has been generated for the case that has been approved for release (222, 224). If no data exists or has been approved for release, writ response system 106 returns a response indicating that no data is currently available (226). Otherwise, if data is available and approved for release, writ response system transmits a response including the data to writ portal system 104 (or directly to the requesting LEA). In some implementations, the process flow may differ. For example, if the writ request is a preservation request, writ response system 106 may respond with an indication that data has been retrieved and stored. However, since the preservation request is not a formal subpoena or court order, no actual information is returned.

A writ request or case may be tagged at various points in a writ response process workflow. The tags appended to the request may influence where jobs, responses and/or requests themselves are placed on various processing queues, such as job queues, review queues and the like. For example, writ portal system 104 may add tags to the writ request that indicate context for the request (such as whether the underlying case involves a crime, such as kidnapping, or otherwise requires a response on an urgent basis). Still further, an administrator reviewing requests on a pre-approval queue may examine the supporting documentation and add tags to the request that include context information. In some implementations, the reviewer may directly classify the case as high priority. Some of the factors that a review or a programmatic process may consider when deciding whether a case is high priority include: the country or local of the user identifier, requesting agency or underlying incident; the name of the requesting agency; the age of the user associated with the user identifier; whether the user account is believed to be fake or real; the nature of the underlying, alleged crime (if any); context information (e.g., child exploitation, pornography, contraband, terrorism); the type of legal writ; and the type of threat posed generally or to the network service provider.

Figure 3:
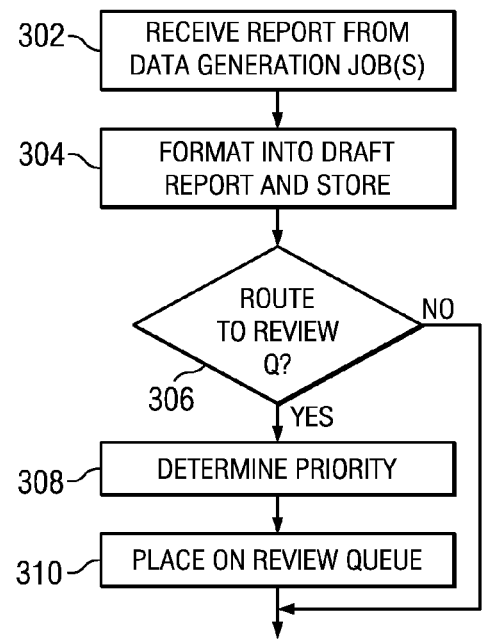
FIG. 3 illustrates another example process flow implemented by a queue manager according to one implementation of the invention.

FIG. 3 illustrates a method implemented by a queue manager process for receiving responses to various jobs for a case and placing the draft report on a review queue. As FIG. 1 illustrates the writ response system 106 may include a queue manager process 120 and a review station 124. In one implementation, after one or more report generation jobs return results of their queries (302), a queue manager 120 may format the received data into a draft report and store it in a data store for later retrieval (304). In one implementation, the draft report is formatted as an XML document. The queue manager 120 may then access one or more attributes of the case to determine whether the draft report should be routed to a review queue (306). For example, preservation requests generally do not require review (except for internal auditing purposes), since the data will not be released in response to a request. Subpoenas, however, generally require a response. Accordingly, if the writ type requires responsive data, then the queue manager may route the draft report to a review queue. In one implementation, the queue manager 120 may access the tags associated with the case or writ request to determine a priority level. For example, a rule set can be configured to assign a priority level or score based on one or more tags associated with the request. The rule set may be changes as circumstances or goals dictate. For example, a writ request associated with an urgent crime in progress or a kidnapping may receive high priority treatment. In one implementation, after the queue manager 120 has resolved a priority level or score, it places the request in a review queue. In one implementation, the queue manager 120 may operate in connection with a high priority queue and a low priority or regular job queue. Any number of queues and queue types can be used. Reports associated with high priority scores or levels may be placed on the high priority queue for faster processing and/or for review by a different set of human reviewers. A human reviewer at review station 124 may then access the draft reports, typically selecting from the high priority queue over other queues, and review the writ request and/or the report, perform additional investigation, conduct additional searches, filter aspects of the report, redact aspects of the report and/or generate a final report. After the final report is generated, the human review may approve it for release, causing it to be transmitted to writ portal system 104 when it polls writ response system 106, as discussed above. After a report is approved, queue manager 120 removes it from the review.

After the requested report is approved, there is a delivery step. As discussed above, the report may be provided the next time a writ portal system 104 transmits a request for the report. In some instances, however, a rule set may determine whether to use other means. For example, writ response system, for certain types of requests, may send push notifications to writ portal system 104 or directly to the requesting LEA system 102 that a report is ready for retrieval.

Figure 4:
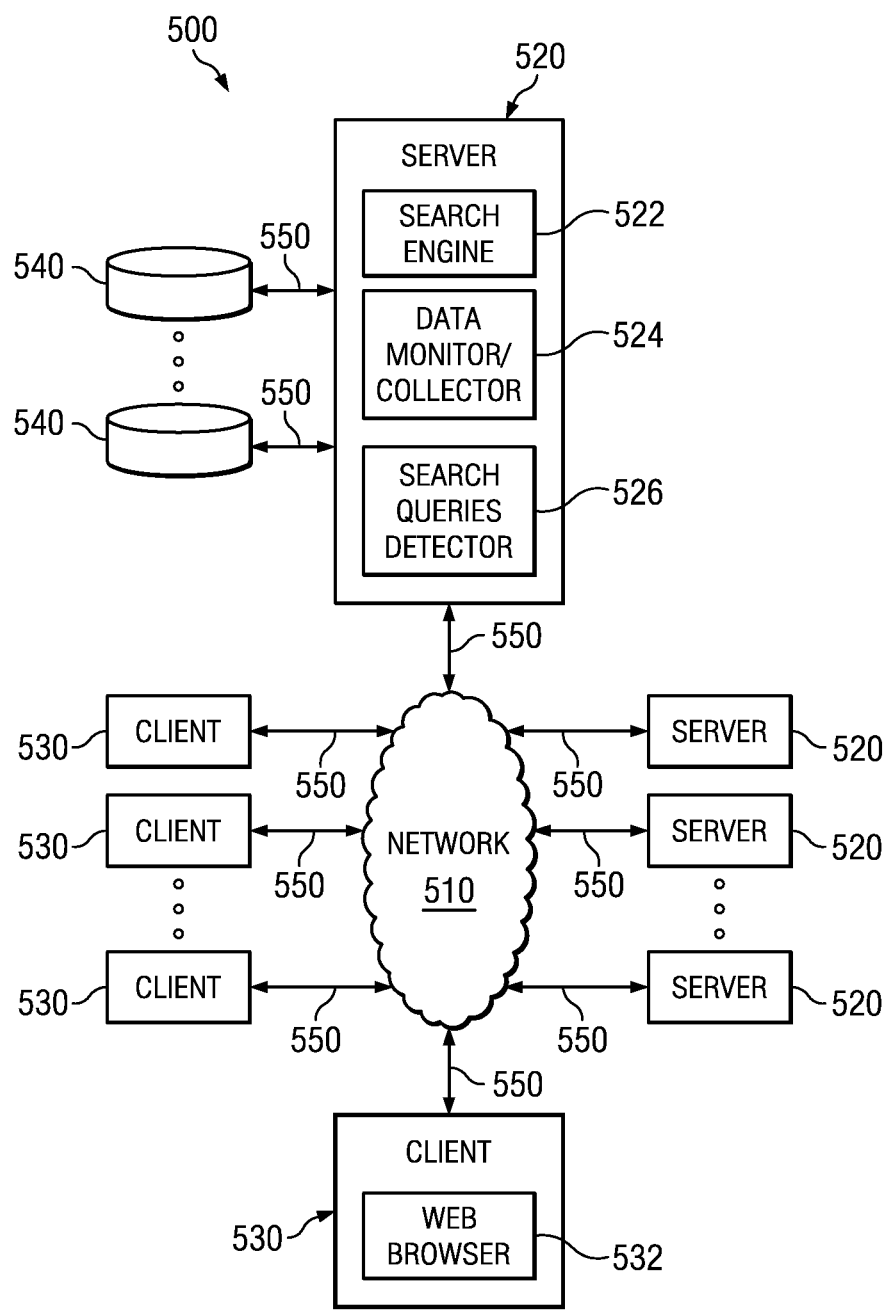
FIG. 4 illustrates an example network environment.

Particular embodiments may be implemented in a network environment. FIG. 4 illustrates an example network environment 500 suitable for providing software validation as a service. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, a router 522 may reside on a server 520 or may be hosted on a separate device. Router 522 may include hardware, software, or embedded logic components or a combination of two or more such components for carrying out various processes described herein.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. In particular embodiments, a client 530 may be one or more services provided by Akamai, which may download various content or data, cache them, and then deliver them to other clients 530 as needed. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
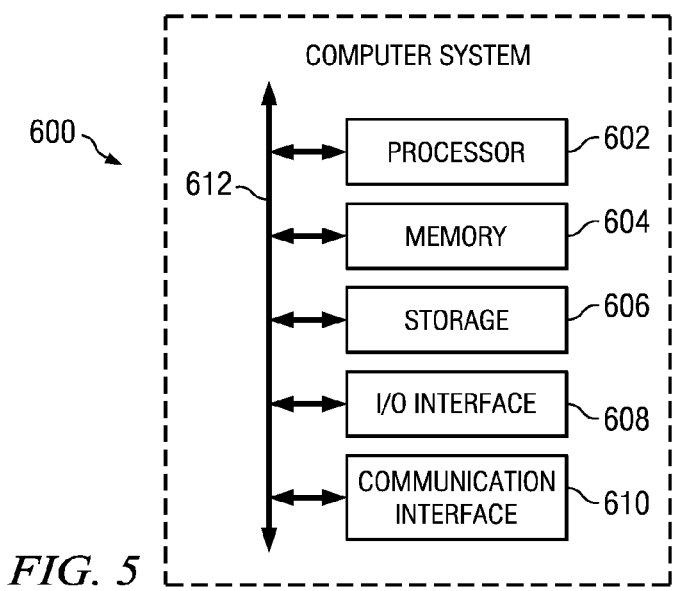
FIG. 5 illustrates an example computer system.

Particular embodiments may be implemented on one or more computer systems. FIG. 5 illustrates an example computer system 600, which may be used to implement a writ response system, a queue manager or a review station. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. An apparatus, comprising:
a memory; one or more processors: and
computer program code stored on a non-transitory computer-readable medium, the computer program code comprising a writ response module and a queue manager;
wherein the writ response module comprises computer-readable instructions operative, when executed, to cause the one or more processors to:
access a writ requesting information and identify a writ type corresponding to the writ; access one or more data stores to generate a report in response to the writ, the report including data obtained from the one or more databases based on the identified writ type;
pass the report to a queue manager;
wherein the queue manager comprises computer-readable instructions operative, when executed, to cause the one or more processors to:
in response to a received report, select a reviewing queue by applying a rule set to one or more tags associated with the writ or the report; and
enter the received report on the selected reviewing queue.

2. The apparatus of claim 1, wherein the reviewing queue is selected from a plurality of reviewing queues, the plurality comprising a high priority queue.

3. The apparatus of claim 1, wherein the writ comprises one or more supporting documents.

4. The apparatus of claim 1, wherein the writ response module further comprises instructions operative to cause the one or more processors to: release the received report to one or more requesting systems upon indication of release approval.

5. The apparatus of claim 1, further comprising an approval station;
   wherein the approval station is operative to:
      display one or more attributes of the writ and the received report; and
      receive an indication of release approval for the received report.

6. The apparatus of claim 5 wherein the approval station is further operative to facilitate editing of the received report.

7. The apparatus of claim 5, wherein the writ response module further comprises instructions operative to cause the one or more processors to:
   apply a rule set to send a push notification or an alert upon indication that a release approval has been entered for the received report.

8. The apparatus of claim 1, further comprising a review station;
   wherein the review station is operative to:
      access the reviewing queues to generate a user interface identifying one or more reports for review; wherein the user interface includes controls allowing the reviewing user to modify the report and to release the report; and
      display a high priority review section.

9. The apparatus of claim 1, wherein the writ response module further comprises instructions operative to cause the one or more processors to: route the writ for pre-approval prior to generating the report, and initiate generation of the report upon approval of the writ.

10. A method comprising:
   accessing, by one or more computing devices, a writ requesting information and identifying a writ type corresponding to the writ;
   accessing one or more data stores to generate a report in response to the writ, the report including data obtained from the one or more databases based on the identified writ type;
   passing the report to a queue manager hosted on one or more computing devices;
   in response to a received report, selecting by the queue manager, a reviewing queue by applying a rule set to one or more tags associated with the writ or the report; and
   entering the received report on the selected reviewing queue.

11. The method of claim 10, wherein the reviewing queue is selected from a plurality of reviewing queues, the plurality comprising a high priority queue.

12. The method of claim 10, wherein the writ comprises one or more supporting documents.

13. The method of claim 10, wherein the writ response module further comprises instructions operative to cause the one or more processors to: release the received report to one or more requesting systems upon indication of release approval.

14. The method of claim 10, further comprising
   displaying, by an approval station, one or more attributes of the writ and the received report; and
   receiving, by the approval station, an indication of release approval for the received report.

15. The method of claim 14 further comprising
   facilitating, by the approval station, editing of the received report.

16. The method of claim 14 further comprising
   applying a rule set to send a push notification or an alert upon indication that a release approval has been entered for the received report.

17. The method of claim 10, further comprising a review station;
   accessing, by a review station, the reviewing queues to generate a user interface identifying one or more reports for review; wherein the user interface includes controls allowing the reviewing user to modify the report and to release the report; and
   displaying, by the review station, a high priority review section.

18. The method of claim 10 further comprising routing the writ for pre-approval prior to generating the report, and initiating generation of the report upon approval of the writ.

19. Computer program code stored on one or more non-transitory computer-readable media, the computer program code comprising a writ response module and a queue manager;
   wherein the writ response module comprises computer-readable instructions operative, when executed, to cause one or more processors to:
      access a writ requesting information and identify a writ type corresponding to the writ;
      access one or more data stores to generate a report in response to the writ, the report including data obtained from the one or more databases based on the identified writ type;
      pass the report to a queue manager;
   wherein the queue manager comprises computer-readable instructions operative, when executed, to cause one or more processors to:
      in response to a received report, select a reviewing queue by applying a rule set to one or more tags associated with the writ or the report; and
      enter the received report on the selected reviewing queue.

20. The computer program code of claim 19, wherein the reviewing queue is selected from a plurality of reviewing queues, the plurality comprising a high priority queue.

* * * * *